US007797216B2

(12) United States Patent
Larsen et al.

(10) Patent No.: US 7,797,216 B2
(45) Date of Patent: Sep. 14, 2010

(54) METHOD AND SYSTEM FOR BACKFILLING TRANSACTIONS IN AN ACCOUNT

(75) Inventors: David R. Larsen, San Jose, CA (US); Katherine A. Welker, San Carlos, CA (US); George A Hansen, Danville, CA (US); Joseph W. Wells, III, San Carlos, CA (US); Karen Tomlinson, San Francisco, CA (US); Glynis L. Hively, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 1451 days.

(21) Appl. No.: 10/756,736

(22) Filed: Jan. 12, 2004

(65) Prior Publication Data

US 2005/0177472 A1      Aug. 11, 2005

(51) Int. Cl.
*G06Q 40/00*      (2006.01)
(52) U.S. Cl. ..................................... 705/36 R
(58) Field of Classification Search ................ 705/36 R
See application file for complete search history.

(56) References Cited

U.S. PATENT DOCUMENTS

| 5,134,564 | A | | 7/1992 | Dunn et al. | |
|---|---|---|---|---|---|
| 5,220,501 | A | | 6/1993 | Lawlor et al. | |
| 6,725,381 | B1 | * | 4/2004 | Smith et al. | ..................... 726/4 |
| 2002/0099633 | A1 | | 7/2002 | Bray | |
| 2002/0184133 | A1 | | 12/2002 | Zangari et al. | |
| 2005/0187852 | A1 | | 8/2005 | Hwang | |
| 2007/0130028 | A1 | | 6/2007 | Provinse | |

OTHER PUBLICATIONS

SmartMoney, "Calculating Taxes on Stock Sales", Dec 17, 2000, accessed via Internet Archive Wayback Machine on May 13, 2008 <http://web.archive.org/web/*/http://www.smartmoney.com/tax/capital/index.cfm?story=stocksales>.*
TradeAccountant, "Reconciliation using TradeAccountant & Excel", Apr. 25 2003, <http://tradeaccountant.com/html/hot_topics/reconcile.htm> acessed via Internet Archive <http://www.archive.org>.*
TradeAccountant, "Creating Manual Groups in TradeAccountant", Apr. 25 2003, <http://tradeaccountant.com/html/hot_topics/groups.htm> acessed via Internet Archive <http://www.archive.org>.*
Fidelity.com, Help Definitions, Dec. 22, 2002 <http://personal.fidelity.com/webxpress/help/topics/help_definition_q.shtml>, archive accessed via Internet Archive Wayback Machine <http://archive.org>.*
Fidelity.com, Help Contents. Dec. 22, 2002. Archive accessed via Internet Archive Wayback Machine <http://archive.org>.*
Cohen, Dave. "Capital Gainz". Mar. 2003.*

* cited by examiner

*Primary Examiner*—James A Kramer
*Assistant Examiner*—Eric T Wong
(74) *Attorney, Agent, or Firm*—Osha • Liang LLP

(57) ABSTRACT

A financial data management application sets up a placeholder entry for entered current holdings information in which all the historical transactions that led to the current holdings have not been accounted for. Backfill transactions may be entered later on to update the placeholder entry with all or part of the historical transactions that led to the current holdings. If a backfill transaction is entered, the placeholder entry is adjusted to reflect the backfill transaction.

26 Claims, 18 Drawing Sheets

Enter Missing Transactions for EBAY INC

This security is missing all or part of its transaction history. When you downloaded or manually entered transactions, the total number of shares in those transactions did not equal the total number of shares you own. Quicken has added a Placeholder Entry to account for missing transactions.

To get complete performance reporting and tax calculations, enter the missing transactions now.

EBAY INC Transactions as of 9/15/2002

| Date | Transaction | Description | Shares | Cost |
|---|---|---|---|---|
| | | *Enter Missing Transactions to complete cost basis* | | * |

Holdings as of 9/15/2002
Total shares you own: 500
Shares from transactions (above): 0    0.00
Shares in Placeholder Entry    500    Unknown

[Enter Missing Transaction...] — 502
[Estimate Average Cost...] — 504

[Help]  [Finish Later]

FIG. 5

Shares Bought

Enter transaction: Buy - Shares Bought

Buy - Shares Bought

Enter the purchase of shares of a security (subtract the cost from my cash balance).

Transaction date: 7/15/2002 — 702

Account: Sample Account

Security name: EBAY INC — 704

Number of shares: 200 — 706

Price paid: 59.50  per share — 708

Commission: 0.00 — 710

Total cost: 11,900.00 — 712

Memo:

[Cancel] [Clear] [Help] [Enter/Done]

METHOD AND SYSTEM FOR BACKFILLING TRANSACTIONS IN AN ACCOUNT

TECHNICAL FIELD

The present invention relates generally to financial data management, and more specifically, to backfilling transactions in an account of a final data management application.

BACKGROUND OF THE INVENTION

Financial data management applications are widely used to record, maintain, track, and utilize various types of personal or business financial data. Such financial data management applications include Quicken® by Intuit Inc. of Mountain View, Calif. These financial data management applications enable users to track cash flow, investments, property and debt by maintaining records of various transactions in various accounts, such as spending or checking accounts, savings accounts, credit accounts, brokerage or securities accounts, retirement accounts, asset accounts, and liability accounts, and the like.

One of the highest barriers for tracking investments in conventional financial data management applications is the necessity for chronologically entering historical transactions information in order to reap the benefits of tracking the performance and tax implications of investments. Tracking the performance and tax implications of investments requires entering the complete history of past transactions that led to the current holdings in an investment account. In order to track the performance and tax implications of investments in conventional financial data management applications, the user is asked to enter the complete history of past transactions up-front when the user sets up the investment account in the financial data management application. If the user enters only current securities holdings information without entering the historical transactions that led to the current holdings, in many cases the software makes certain assumptions that make it difficult to enter past transactions information later on to track the performance and tax implications of investments in conventional financial data management applications. In some cases, the software does not permit later entry of the past transactions, so users cannot change their minds and provide more historical data as they have more time to enter them or as they realize the benefits that more complete data would bring to them.

Therefore, there is a need for a method to initially enter just the holdings information for an account in a financial data management application and to later enter, or "backfill" the past transactions information for the current holdings later on. There is also a need for a method to allow users to begin to obtain the benefits of tracking investments in the financial data management application without a great deal of up-front work, and to get increased benefits from the financial data management application as they enter more past transactions information.

SUMMARY OF INVENTION

The present invention provides a method, system, and computer program product for automatically setting up placeholder entries in various types of financial data management applications and entering one ore more backfill transactions later on to adjust the placeholder entries. A placeholder entry is an automatically generated record that accounts for all historical transactions that have not been entered. A backfill transaction is a later-entered record that specifies past transactions that led to the current holdings. Entry of a backfill transaction causes adjustment or deletion of a corresponding placeholder entry, as appropriate.

In one embodiment, the financial data management application manages a securities brokerage account. The user enters or downloads current holdings information, including the date on which the holdings information is entered, the securities name, and the number of shares in the current holdings. The financial data management application stores the holdings information and also adds a tag indicating a placeholder entry to the stored holdings information, if a placeholder entry should be generated for the entered holdings information. A placeholder entry is generated if the entered holdings information does not include information on all the historical transactions that led to the current holdings. For example, if the holdings information does not include the cost basis or the date of a transaction that led to the current holdings, a placeholder entry is generated for the entered holdings information.

The user may later enter backfill transactions to update the placeholder entry with all or part of the historical transactions that led to the current holdings. In one embodiment, the user enters transaction information to the financial data management application, including the date of the transaction, the account name, the securities name, the type of the transaction (buy or sell), the number of shares, and the cost basis (or the price of the transaction) of the transaction. The financial data management application determines whether the entered transaction is a backfill transaction corresponding to one of the placeholder entries previously stored by the financial data management application. If the transaction date is earlier than the date of any placeholder entry corresponding to the same securities, the entered transaction is a backfill transaction for such placeholder entry. The financial data management application stores the entered transaction and adjusts the placeholder entry to reflect the entered backfill transaction.

The present invention has the advantage that users of the financial data management applications may quickly and easily start using such applications and obtain the benefit of using the applications without having to enter all the historical transactions information. If any of the current holdings information lacks the complete transaction history, a placeholder entry is generated for the corresponding holdings information. The user can enter the historical transactions later on by entering backfill transactions to adjust the placeholder entries. The placeholder entries also allow users to continue using the financial data management application without the additional data entry efforts to enter the backfill transactions, if they do not need access to features of the financial data management application that require all the backfill transaction information. The users may initially decide not to enter the backfill transactions but later on decide to backfill transactions if their goals for investment tracking have changed.

BRIEF DESCRIPTION OF THE DRAWINGS

The teachings of the present invention can be readily understood by considering the following detailed description in conjunction with the accompanying drawings.

FIG. 2 is a screenshot illustrating the summary of holdings information after setting up the brokerage account in a financial data management application, according to one embodiment of the present invention.

FIG. 3 is a screenshot illustrating the placeholder entries in the summary of holdings information after setting up the brokerage account in a financial data management application, according to one embodiment of the present invention.

FIG. 5 is a screenshot illustrating a screen for providing options for entering backfill transactions corresponding to the placeholder entries in a financial data management application, according to one embodiment of the present invention.

FIG. 7 is a screenshot illustrating a screen for entering backfill transactions information corresponding to the placeholder entries in a financial data management application, according to one embodiment of the present invention.

FIG. 8 is a screenshot illustrating transactions information after entering some backfill transactions corresponding to the placeholder entries in a financial data management application, according to one embodiment of the present invention.

FIG. 9 is a screenshot illustrating the summary of holdings information after entering some backfill transactions corresponding to the placeholder entries in a financial data management application, according to one embodiment of the present invention.

FIG. 11 is a screenshot illustrating the summary of holdings information after entering an additional transaction irrelevant to the placeholder entries in a financial data management application, according to one embodiment of the present invention.

DETAILED DESCRIPTION OF EMBODIMENTS

Figure 1:
FIG. 1 is a screenshot illustrating setting up a brokerage account in a financial data management application, according to one embodiment of the present invention.

The embodiments of the present invention will be described below with reference to the accompanying drawings. Like reference numerals are used for like elements in the accompanying drawings.

FIG. 1 is a screenshot illustrating setting up a brokerage account in a financial data management application, according to one embodiment of the present invention. The financial data management application can be, for example, Quicken® 2004 by Intuit Inc. In this embodiment, the user sets up the brokerage account by manually entering the holdings information, such as the security name 102, total number of shares 104, and the type of security 106, although the holdings information may be downloaded from a remote financial web site. However, the user does not enter the historical transactions information that led to the current holdings. In this example, the user entered holdings of 700 shares of Johnson & Johnson stock 108, 500 shares of eBay stock 110, 350 shares of LIS Logic Corp. stock 112, and 200 shares of Walt Disney Holdings Co. stock 114, but did not enter the transactions that yielded these holdings.

Figure 2:
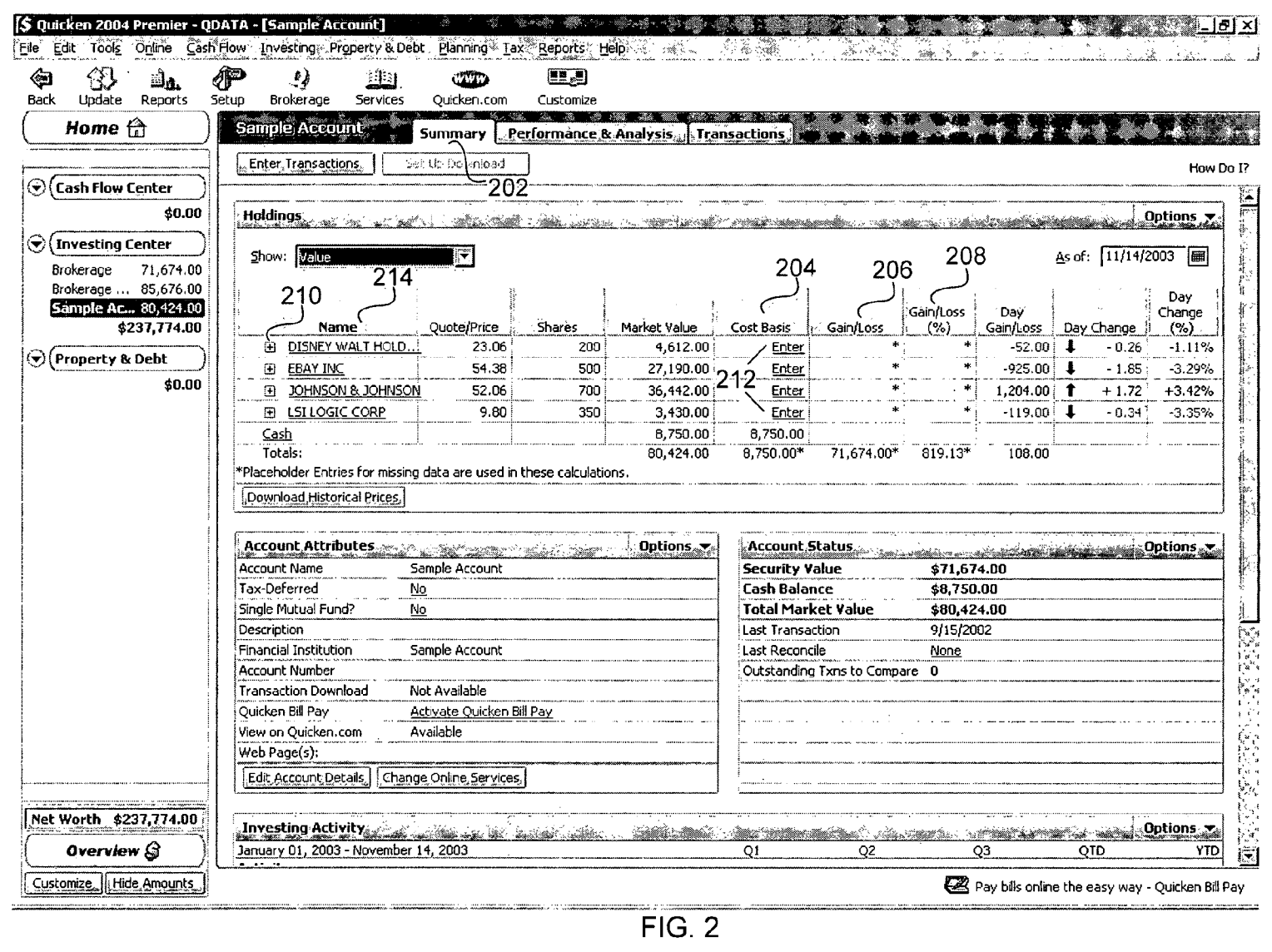

FIG. 2 is a screenshot illustrating the summary of holdings information after setting up the brokerage account in a financial data management application, according to one embodiment of the present invention. After setting up the account as illustrated in FIG. 1, the user is taken to the Summary tab 202 for the account that shows a holdings snapshot of the user's account. The holdings snapshot displays each security in an unexpanded view. The word "Enter" 212 in the cost basis column 204 indicates that some historical transaction information is incomplete and that there is a placeholder entry stored for the corresponding holding. The user can click on the "Enter" link to enter the missing information, but is not required to do so immediately. For example, the date, cost basis, number of shares, and types (buy/sell) of certain past transactions that led to the current holdings may be missing. Therefore, the financial data management application is missing information it needs to track investment performance, such as the gain/loss 206 and the gain/loss (%) 208. The "+" signs 210 to the left of the security name column 214 indicates that the corresponding holding may be expanded to show more detailed transactions information corresponding to the holdings.

Figure 3:
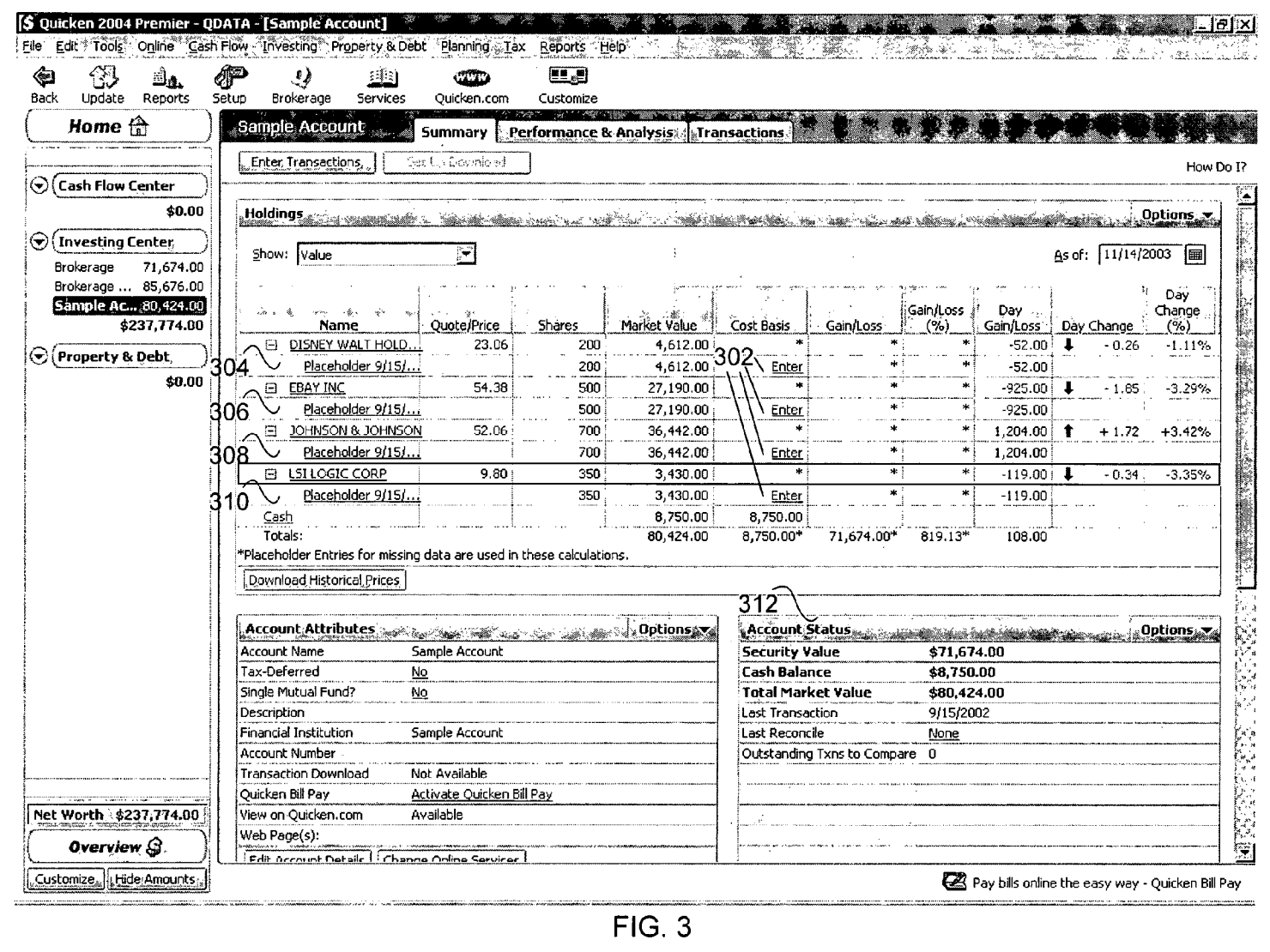

FIG. 3 is a screenshot illustrating the placeholder entries in the summary of holdings information after setting up the brokerage account in a financial data management application, according to one embodiment of the present invention. If the user wants more information about what is included in the holdings for a particular security, he can click on the plus (+) sign 210 of FIG. 2 to expand the security lot list. The resulting view, shown in FIG. 3, appears if initiated by the user by clicking on the plus (+) sign 210. When the lot list is expanded, the "Enter" links 302 appear in the particular placeholder entries 304, 306, 308, 310 that are missing certain historical transactions information. The "Enter" link 302 in the placeholder entries 304, 306, 308, 310 indicate that they are missing cost basis information for the various transaction (s) that led to the current holdings of the corresponding securities. For example, the placeholder entry 306 indicates that the securities holding for eBay is missing the cost basis information. Note that even without entering past transactions data for the holdings, the user is already able to monitor his account balance status 312 from the Summary tab 202 because the account balance status 312 does not require all the historical transaction information.

Figure 4:
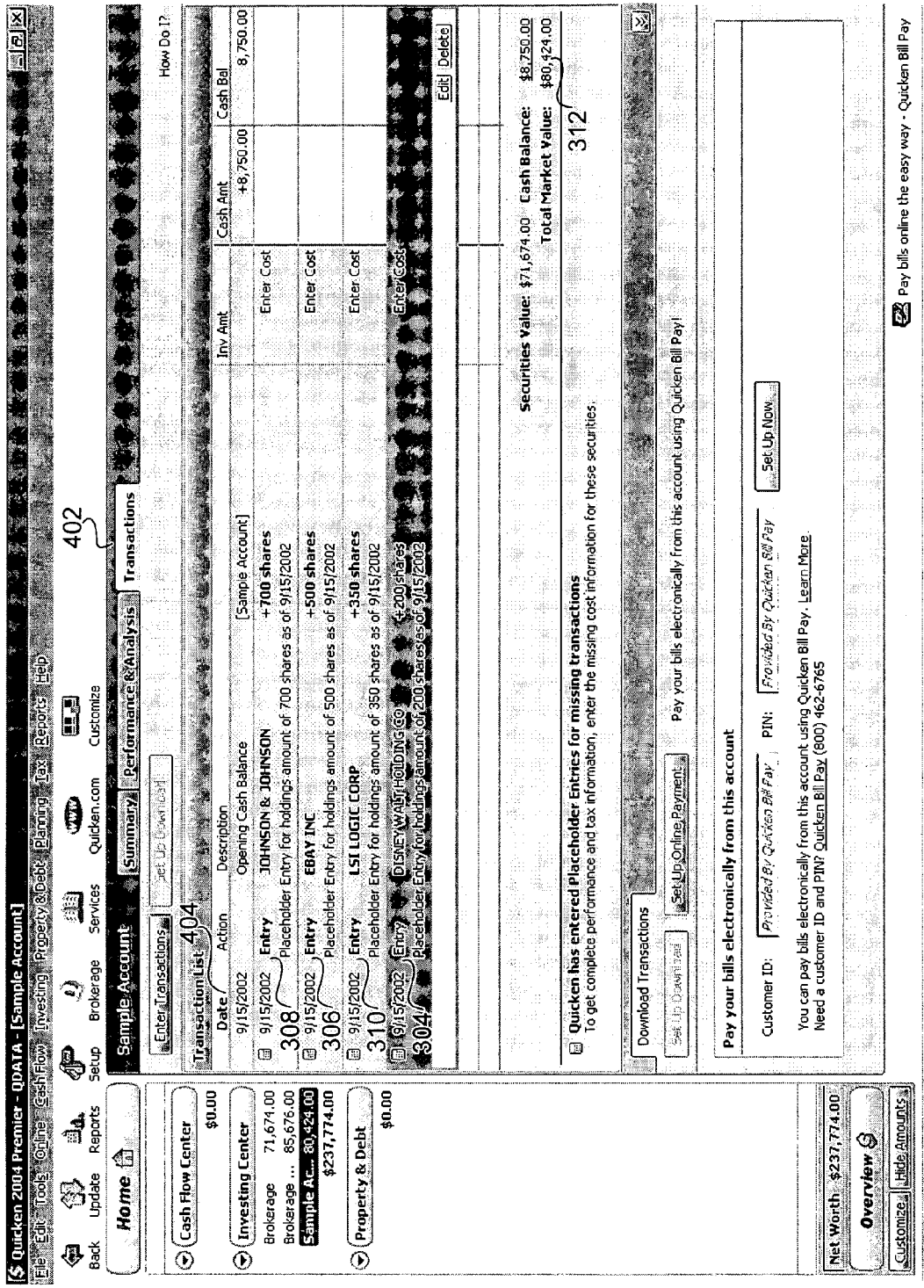
FIG. 4 is a screenshot illustrating the placeholder entries in the transactions information after setting up the brokerage account in a financial data management application, according to one embodiment of the present invention.

FIG. 4 is a screenshot illustrating the placeholder entries in the transactions information after setting up the brokerage account in a financial data management application, according to one embodiment of the present invention. If the user chooses to go to the Transactions tab 402 after setting up the account, the user will see a chronological view of the placeholder transactions 304, 306, 308, 310 in the transactions log. The dates 404 in the transactions log represent the date the holdings information was entered manually or downloaded to the financial data management application from a remote web site to set up the user's account. Again, note that even without entering past transactions data for the holdings, the user is already able to monitor his account balance status 312.

FIG. 5 is a screenshot illustrating a screen for providing options for entering backfill transactions corresponding to the placeholder entries in a financial data management application, according to one embodiment of the present invention. When the user clicks on one of the "Enter" tabs 212 in the Holdings log shown in FIG. 2 or one of the "Enter" links 312 in the Transactions log shown in FIG. 3, the screen of FIG. 5 is shown to the user. In this example, the "Enter" tab 212 corresponding to the eBay placeholder entry 306 has been clicked. The user is given the option of entering 502 backfill transaction data for the placeholder entries or estimating 504 the average costs for the placeholder entries when the accurate backfill transaction data are unknown to the user or when the user just wants to enter the approximate cost basis for the stock.

Figure 6:
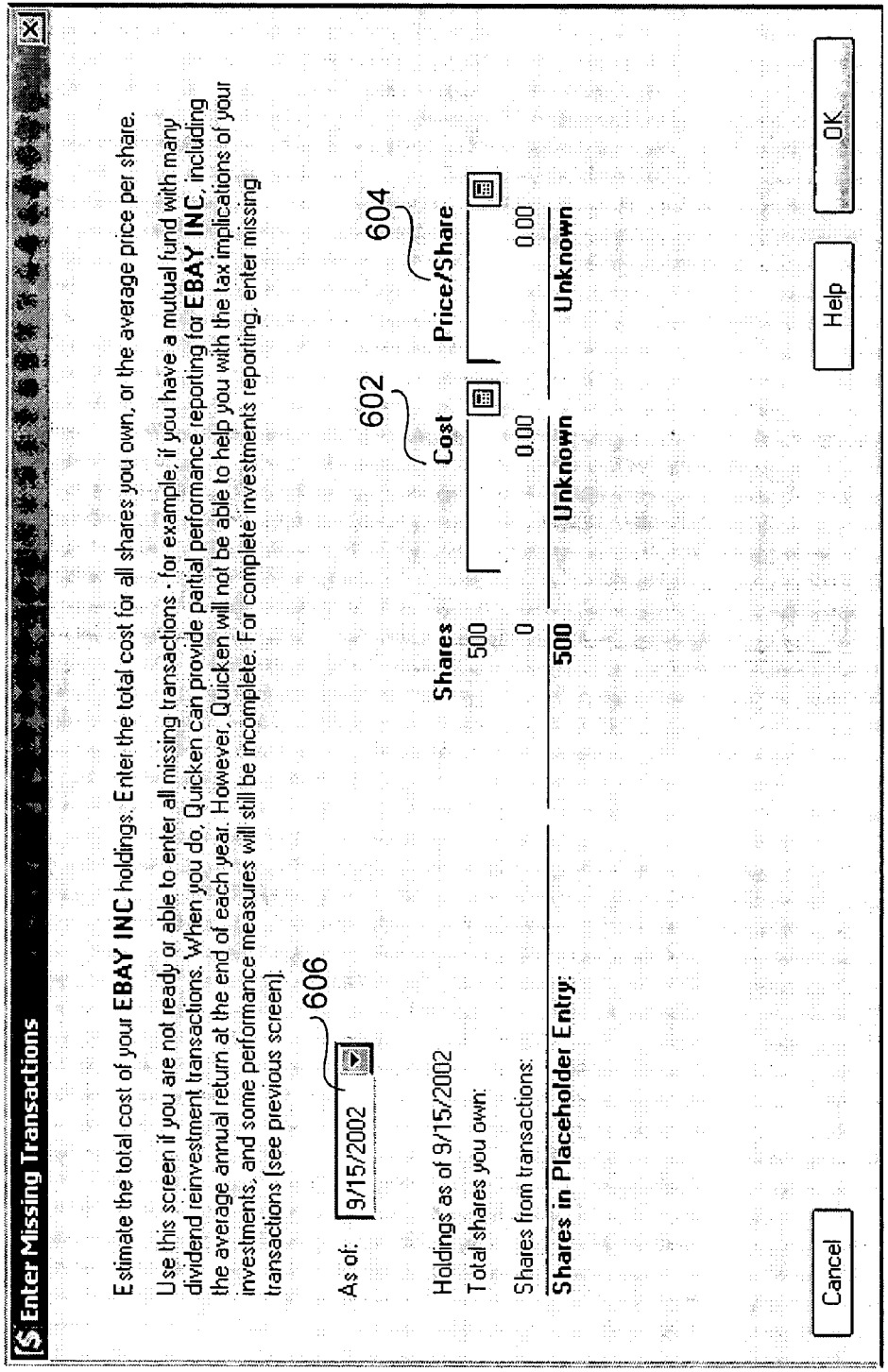
FIG. 6 is a screenshot illustrating a screen for estimating the cost of the holdings in place of entering backfill transactions in a financial data management application, according to one embodiment of the present invention.

FIG. 6 is a screenshot illustrating a screen for estimating the cost of the holdings instead of entering backfill transactions in a financial data management application, according to one embodiment of the present invention. This screen appears when the user decides to estimate the average cost by clicking on "Estimate Average Cost" 504 in the screen shown in FIG. 5, rather than entering the backfill transactions for the placeholder entries. The user is asked to estimate the total cost of the holdings corresponding to the placeholder entries. In this example, the user is asked to estimate the total cost 602 for purchasing the 500 shares of eBay stock corresponding to the holdings information entered on the date 606 (Sep. 15, 2002). The price per share 604 is calculated by the financial data management application based upon the entered cost 602. The estimated cost 602 is used, for example, to track investment performance (e.g., gain/loss) of the eBay stock. The estimated cost 602 may be stored in the placeholder transaction as if the shares had been purchased at that price. No new placeholder entry is created, but the corresponding existing placeholder entry is modified to reflect the estimated cost 602.

FIG. 7 is a screenshot illustrating a screen for entering backfill transactions information corresponding to the placeholder entries in a financial data management application, according to one embodiment of the present invention. This screen appears when the user decides to enter the backfill transaction information by clicking on "Enter Missing Transaction" 502 in the screen shown in FIG. 5. In this example, the user is asked to enter the backfill transaction information for eBay stock. In one embodiment, the backfill transaction information includes the transaction date 702, the security name 704, the number of shares 706, the price per share 708, the commission 710, and the total cost 712. This backfill transaction information is used to track investment performance of the eBay stock.

Figure 8:
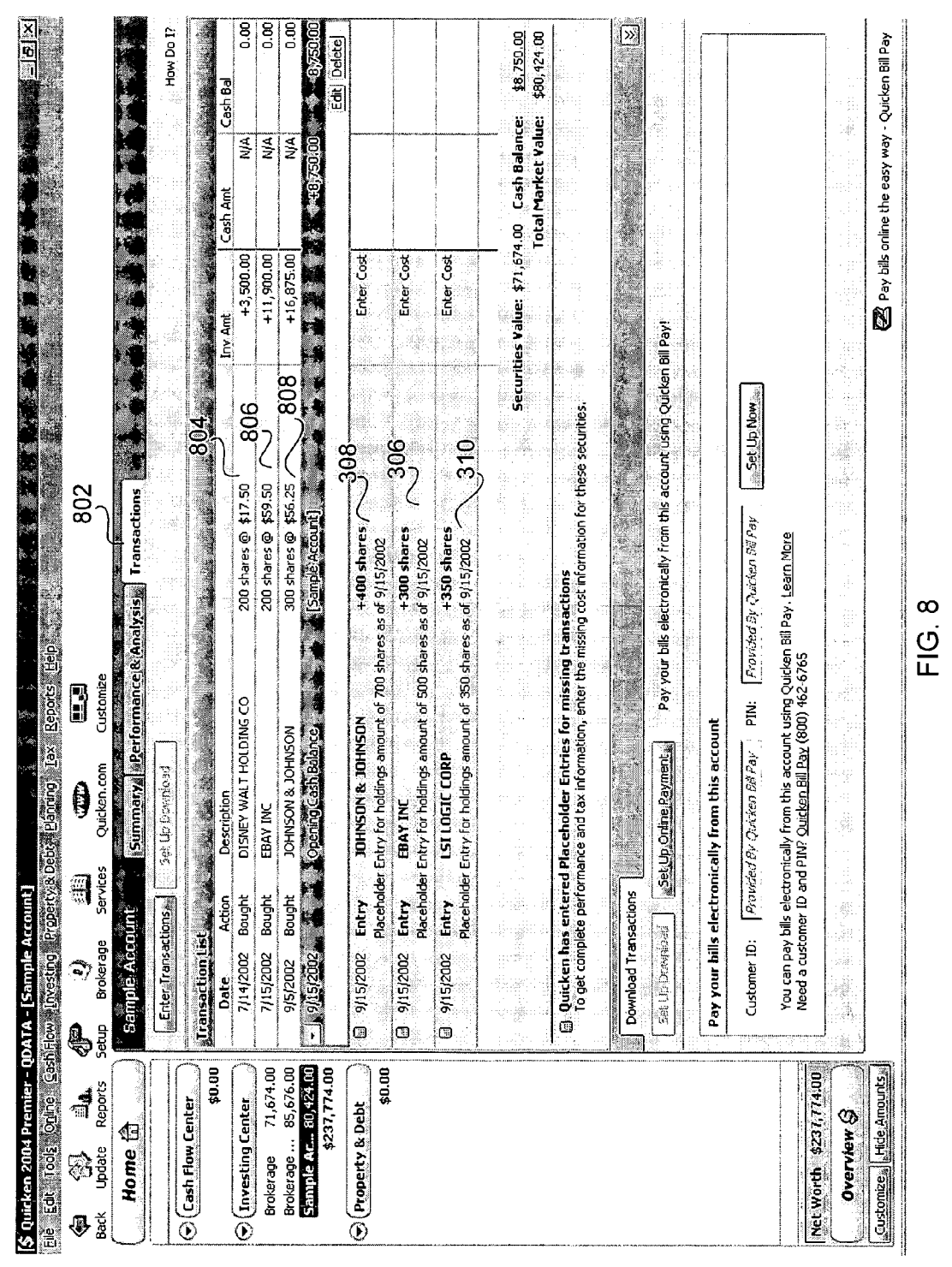

FIG. 8 is a screenshot illustrating the transaction information after entering some backfill transactions corresponding to the placeholder entries in a financial data management application, according to one embodiment of the present invention. The backfill transaction information is used by the financial data management application to adjust previously stored placeholder entries that correspond to the entered backfilled transaction. The screen shows the backfill transactions 804, 806, 808 in the Transactions log 802 after the user entered several historical "buy" transactions that occurred prior to the date that the user set up the account, using the method described in FIG. 7. For example, the backfill transaction 804 corresponds to the placeholder entry 304 for Walt Disney Holdings, in which the backfill transaction data for all of the 200 shares in the placeholder entry 304 are accounted for. The placeholder entry 304 for Walt Disney Holdings disappeared from the Transactions log 802, since the total amount of shares (200 shares) in the placeholder entry 304 were accounted for by the backfill transaction 804. The backfill transaction 806 corresponds to the placeholder entry 306 for eBay, in which the backfill transaction data for 200 shares of the 500 shares in the placeholder entry 306 are accounted for. The number of shares in the placeholder entry 306 for eBay was adjusted from 500 to 300 to reflect the backfill transaction 806. The backfill transaction 808 corresponds to the placeholder entry 308 for Johnson & Johnson, in which the backfill transaction data for 300 shares of the 700 shares in the placeholder entry 308 are accounted for. The number of shares in the placeholder entry 308 for Johnson & Johnson was adjusted from 700 to 400 to reflect the backfill transaction 808. The placeholder entry 310 for LSI Logic was not adjusted at all, since no backfill transaction corresponding to the placeholder entry 310 has yet been entered to the financial data management application.

Figure 9:
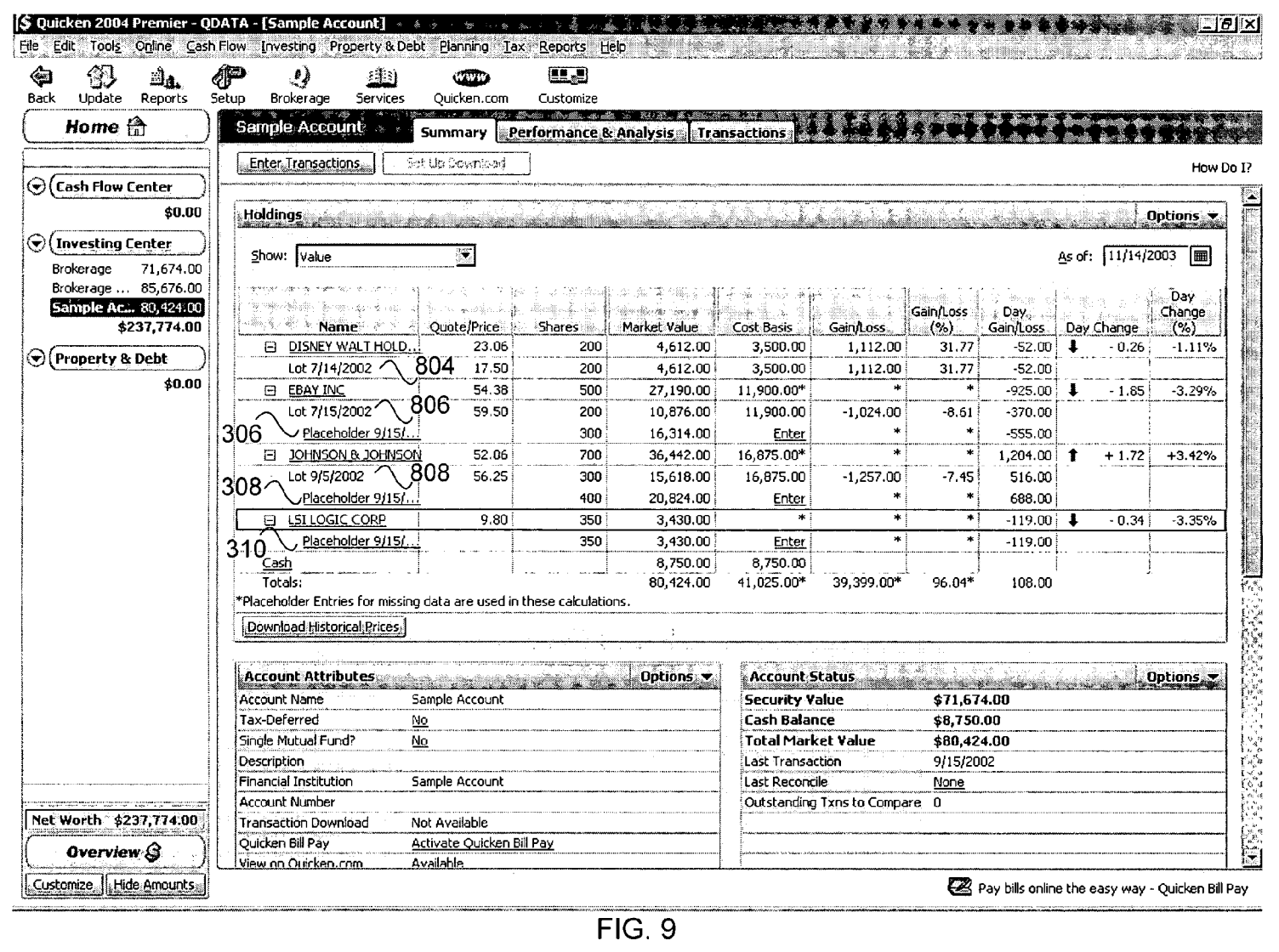

FIG. 9 is a screenshot illustrating the summary of holdings information after entering some backfill transactions corresponding to the placeholder entries in a financial data management application, according to one embodiment of the present invention. As a result of entering the backfill transactions 804, 806, 808 as illustrated in FIGS. 8 and 9, the placeholder entries 304, 306, 308, 310 shown in FIG. 3 were adjusted to reflect the backfilled transactions 804, 806, 808. For example, the placeholder entry 304 for Walt Disney Holdings disappeared, since the total amount of shares (200 shares) in the placeholder entry 304 were accounted for by the backfill transaction 804. The number of shares in the placeholder entry 306 for eBay was adjusted from 500 to 300 to reflect the backfill transaction 806. The number of shares in the placeholder entry 308 for Johnson & Johnson was adjusted from 700 to 400 to reflect the backfill transaction 808. The placeholder entry 310 for LSI Logic was not adjusted at all, since no backfill transaction corresponding to the placeholder entry 310 has yet been entered to the financial data management application.

Figure 10:
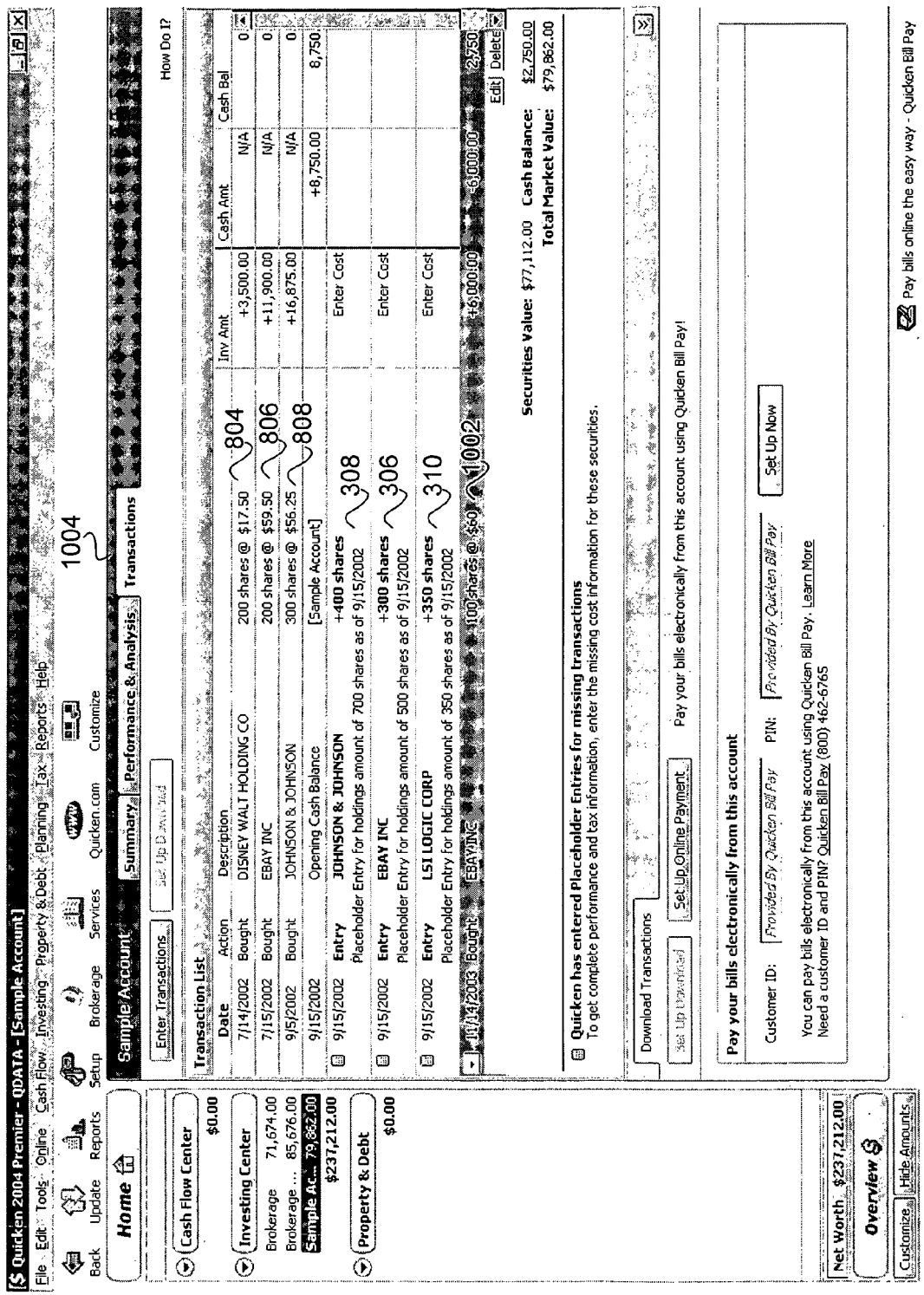
FIG. 10 is a screenshot illustrating the transaction information after entering an additional transaction irrelevant to the placeholder entries in a financial data management application, according to one embodiment of the present invention.

FIG. 10 is a screenshot illustrating the transaction information after entering an additional transaction unrelated to the placeholder entries in a financial data management application, according to one embodiment of the present invention. A transaction is unrelated to the placeholder entry if the date of the transaction is later than the date of the placeholder entry. Such an unrelated transaction does not affect the placeholder entries. In other words, when the financial data management application detects that an entered transaction is unrelated to a previously entered placeholder entry (because the date of the entered transaction is alter than the date of the placeholder entry), no adjustment is made to the placeholder entry. For example, the user added an additional transaction 1002 indicating a "buy" of 100 shares of eBay stock at $60 per share to the Transactions log 1004. The date of the transaction 1002 is Nov. 14, 2003, which is later than the date (Sep. 15, 2002) of the placeholder entry 308 for eBay. This means that the transaction 1002 is unrelated to the placeholder entry 308 for eBay, since it is not historical transaction data for backfilling the placeholder entry 306 for eBay. Accordingly, the placeholder entry 306 for eBay is not adjusted at all as a result of entering the additional eBay transaction 1002 and is merely added as an additional transaction to the Transactions log 1004. In other words, transactions (e.g., buy or sell) occurring after the initial date of the placeholder entries do not affect the placeholder transactions. However, entering the transaction 1002 affects the current holdings information, as will be explained with reference to FIG. 11.

Figure 11:
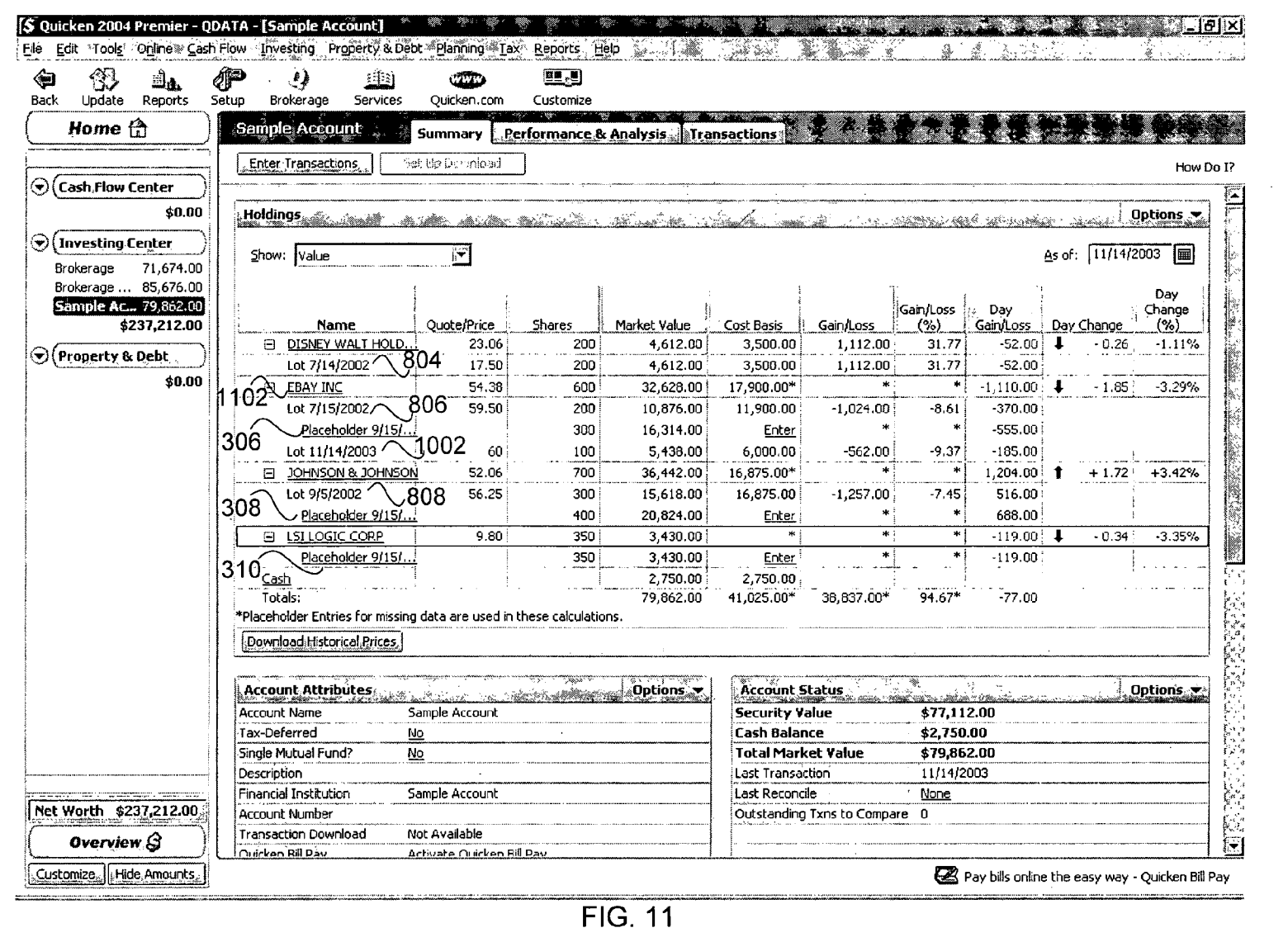

FIG. 11 is a screenshot illustrating the summary of holdings information after entering an additional transaction irrelevant to the placeholder entries, according to one embodiment of the present invention. As explained previously, a transaction is unrelated to the placeholder entries if the date of the transaction is later than the date of the placeholder entry. Such an unrelated transaction does not affect the placeholder entries. In other words, when the financial data management application detects that an entered transaction is unrelated to a previously entered placeholder entry (because the date of the entered transaction is alter than the date of the placeholder entry), no adjustment is made to the placeholder entry. As shown in FIG. 11, the transaction 1002 does not affect the placeholder entry 306, since the date (Nov. 14, 2003) of the transaction 1002 is later than the date (Jul. 15, 2002) of the placeholder entry 306. However, the transaction 1002 affected the total number of shares (600) in the current eBay holding 1102, such that it includes the number of shares (300) of the backfill transaction 806, the number of shares (300) in the placeholder entry 306, and the number of shares (100) of the additional transaction 1002.

Figure 12:
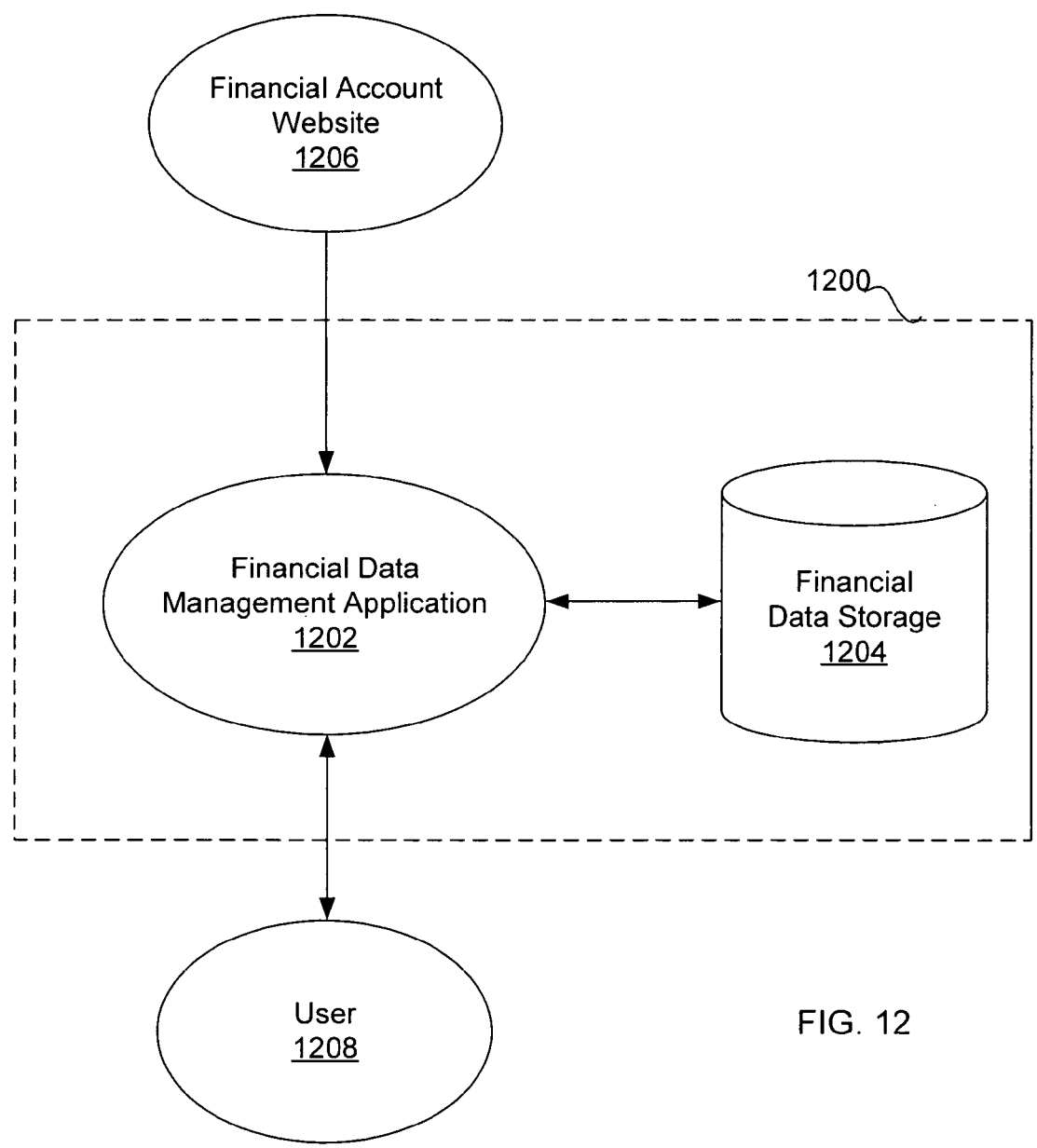
FIG. 12 is a diagram illustrating the system architecture of a financial data management system, according to one embodiment of the present invention.

FIG. 12 is a diagram illustrating the architecture of a financial data management system 1200, according to one embodiment of the present invention. The financial data management system 1200 includes a financial data management application 1202 and a financial data storage database 1204. The financial data management application 1202 may be, for example, one such as Quicken® by Intuit Inc. of Mountain View, Calif. The financial data management storage database 1204 may be a relational database or any other type of database that stores the financial data used by the financial data management application 1202. Both the financial data management application 1202 and the financial data storage database 1204 may be stored and operated on a single computer or on separate computer systems communicating with each other through a data communication network such as the Internet.

The user 1208 enters various financial data to the financial data management application 1202, which is then processed and stored to the financial data storage database 1204. The user 1208 also receives various financial data from the financial data management application 1202, including processed financial data (investment performance statistics, tax implications, and the like) as well as the raw financial data entered by the user 1208. The user 1208 may interact with the financial data management application 1202 directly on a computer on which the financial data management application 1202 resides or through a separate computer coupled to the financial data management application 1202 by a data communication network such as the Internet.

The financial account website 1206 may be one operated by a third party that maintains the actual financial accounts that are kept track of in the financial data management application 1202. The financial account website 1206 may be operated by a securities brokerage company, a bank or credit union, a credit card company, or the like. Rather than manually entering all the financial data to the financial data management application 1202, the user may download certain financial data from the financial account website 1206 to the financial application 1202 if the financial account website 1206 supports the financial data structures used by the financial data management application 1202.

The financial data management application 1202 has the capability of generating and storing placeholder entries for accounts that do not include the complete history of transactions that led to the current holdings in the accounts. The financial data management application 1202 is also capable of receiving backfill transactions corresponding to the placeholder entries and adjusting the placeholder entries to reflect the entering of such backfill transactions. The financial data management application 1202 is capable of using the current holdings information to process and report certain financial data without using backfill transaction data when it is not available, but is also capable of fully using the backfill transaction data to process and report other financial data when the backfill transaction data becomes available as a result of entering such backfill transaction data by the user.

Figure 13:
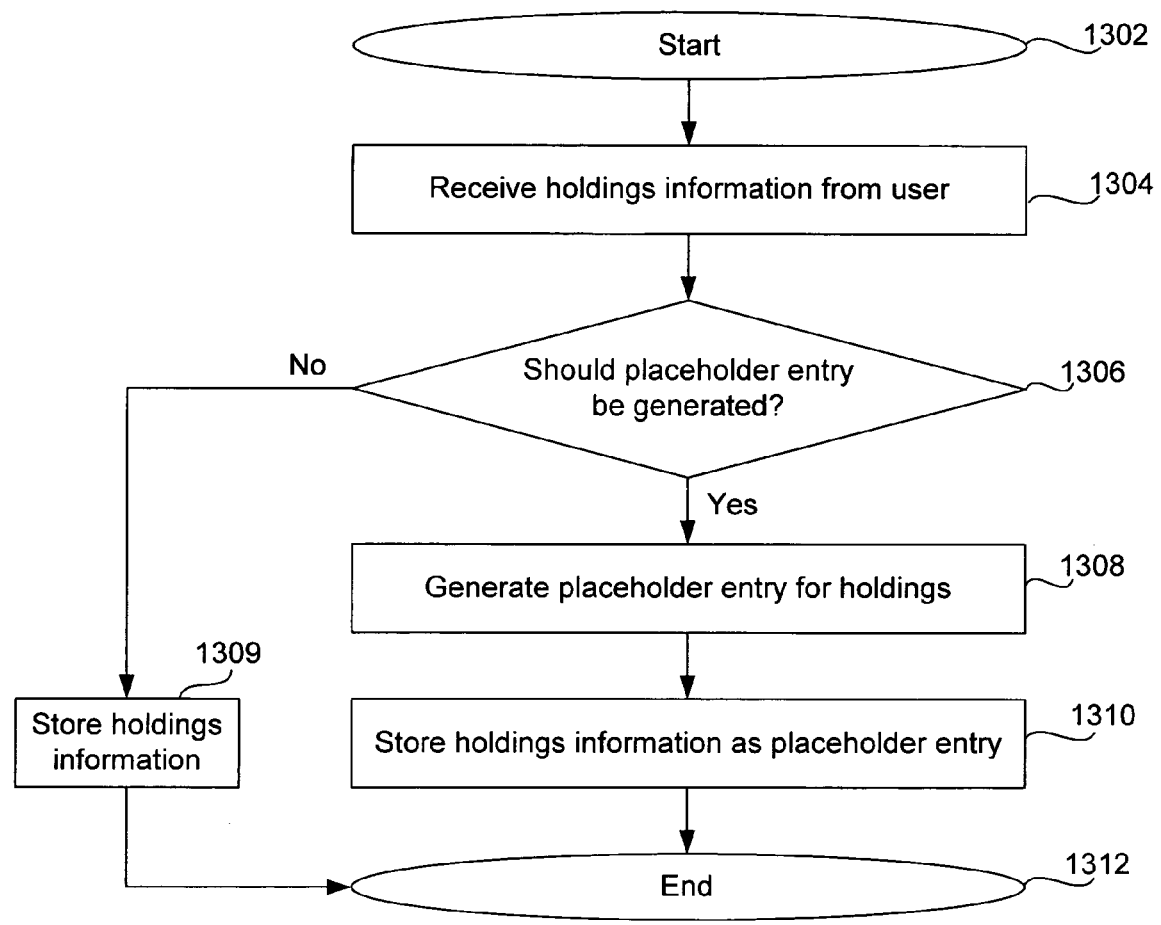
FIG. 13 is a flowchart illustrating a method of setting up a placeholder entry in a financial data management application, according to one embodiment of the present invention.

FIG. 13 is a flowchart illustrating the method of setting up a placeholder entry in a brokerage account of a financial data management application, according to one embodiment of the present invention. The method of FIG. 13 is carried out in a financial data management application, such as Quicken® by Intuit Inc. As the process starts 1302, the financial data management application 1202 receives 1304 holdings information from the user. In one embodiment, the holdings information relates to the user's current securities holdings, and includes the names of the securities and the total number of shares of the securities owned by the users. Although the embodiment of the present invention of FIG. 13 is illustrated herein in the context of a securities brokerage account, the present invention can be used to set up placeholder entries for any other type of account, such as inventory, cash, checking, mutual funds, bonds, savings, futures, etc., that has a current holding to be used as a placeholder entry and historical transactions that led to the current holdings.

The financial data management application 1202 determines 1306 whether a placeholder entry should be generated for the entered holdings information. A placeholder entry is generated if the holdings information does not include the complete historical transaction information that led to the current holdings. For example, for a brokerage account, if the entered holdings information includes the securities names and the number of shares in the brokerage account but does not include the cost basis and the date of the transaction, a placeholder entry should be generated for the entered holdings so that the historical transaction information may be entered later on when the user has more time and or is willing to put in more efforts.

If a placeholder entry need not be generated because the holdings information is complete with all the historical transaction information that led to the current holdings, then the holdings information is stored 1309 and the process ends 1312. If a placeholder entry should be generated because the holdings information is not complete with all the historical transaction information that led to the current holdings, then a placeholder entry corresponding to the entered holdings information is generated 1308 and the process ends 1312. A placeholder entry is generated 1308 by attaching an indication of a placeholder entry to the entered holdings information. Then, the placeholder entry for the entered holdings is stored 1310 and the process ends 1312.

Figure 14:
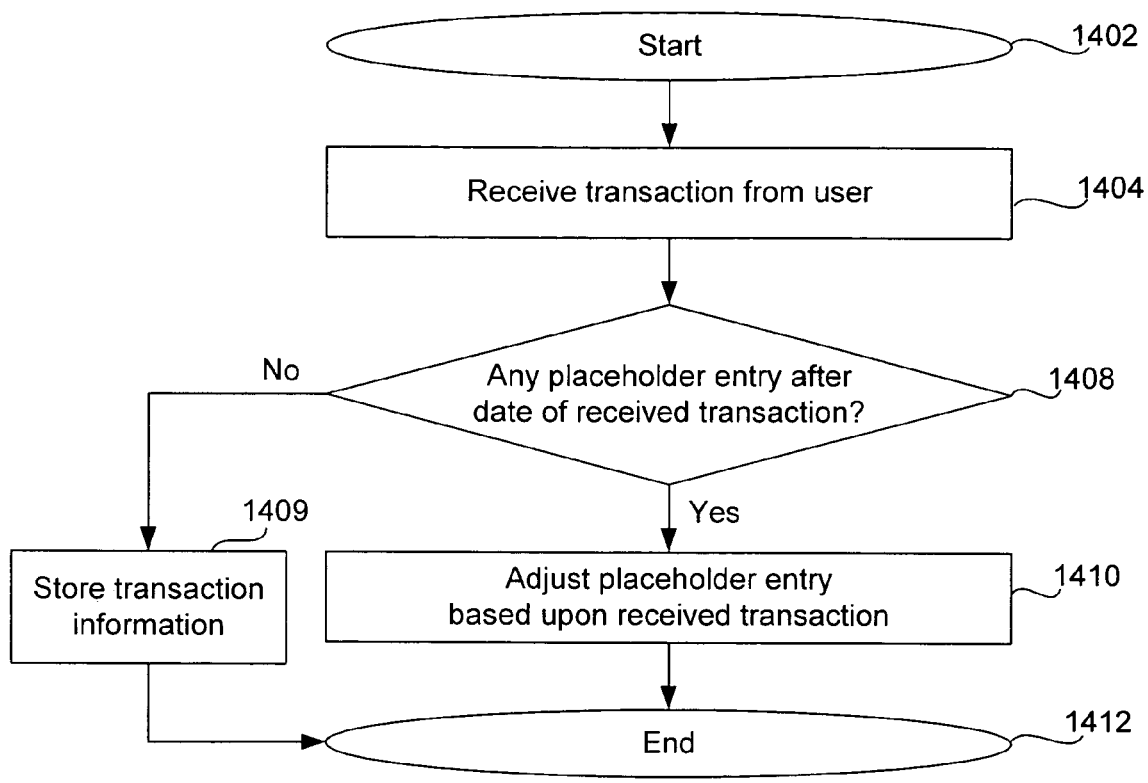
FIG. 14 is a flowchart illustrating a method of entering a backfill transaction corresponding to a placeholder entry in a financial data management application, according to one embodiment of the present invention.

FIG. 14 is a flowchart illustrating a method of entering a backfill transaction corresponding to a placeholder entry in a financial data management application, according to one embodiment of the present invention. The method of FIG. 14 is carried out in a financial data management application, such as Quicken® by Intuit Inc. It is also assumed that at least one placeholder entry has been generated and stored as described with reference to FIG. 13.

As the process starts 1402, the financial data management application 1202 receives 1404 information on a transaction from the user. In one embodiment, the transaction information relates to the user's current securities holdings, and includes the date of the transaction, the account to which the transaction pertains, the name of the securities, the type of transaction (buy/sell), the number of shares in the transaction, and the cost basis of the transaction, and the like. Although the embodiment of the present invention of FIG. 14 is illustrated herein in the context of a securities brokerage account, the present invention can be used to adjust placeholder entries for any other type of account, such as inventory, cash, mutual funds, bonds, savings, futures, etc., that has a current holding to be used as a placeholder entry and historical transactions that led to the current holdings. In such case, the transaction information will include information that is typically used by the particular type of account.

The financial data management application 1202 determines 1408 whether there is any placeholder entry that has a date subsequent to the date of the received transaction. To this end, the financial data management application examines the dates of the placeholder entries stored by financial data management application that pertain to the securities same as that of the entered transaction and finds such placeholder entry with the earliest date. If there is no such placeholder entry, then the financial data management application 1202 stores 1409 the entered transaction and the process ends 1412.

If there is such a placeholder entry, this means that the entered transaction is a backfill transaction entered to backfill the historical transactions that led to the current holdings in the placeholder entry. Thus, the financial data management application 1202 stores 1410 the entered transaction and also adjusts 1410 the placeholder entry to reflect the entered transaction and the process. For example, if the entered transaction is a "buy" transaction of securities, the number of shares in the placeholder entry for that stock is reduced by the number of shares in the entered "buy" transaction to reflect that the backfill "buy" transaction was entered for the placeholder entry. If the entered transaction is a "sell" transaction, then the number of shares in the placeholder entry for that stock is increased by the number of shares in the entered "sell" transaction to reflect that the backfill "sell" transaction was entered for the placeholder entry.

Figure 15:
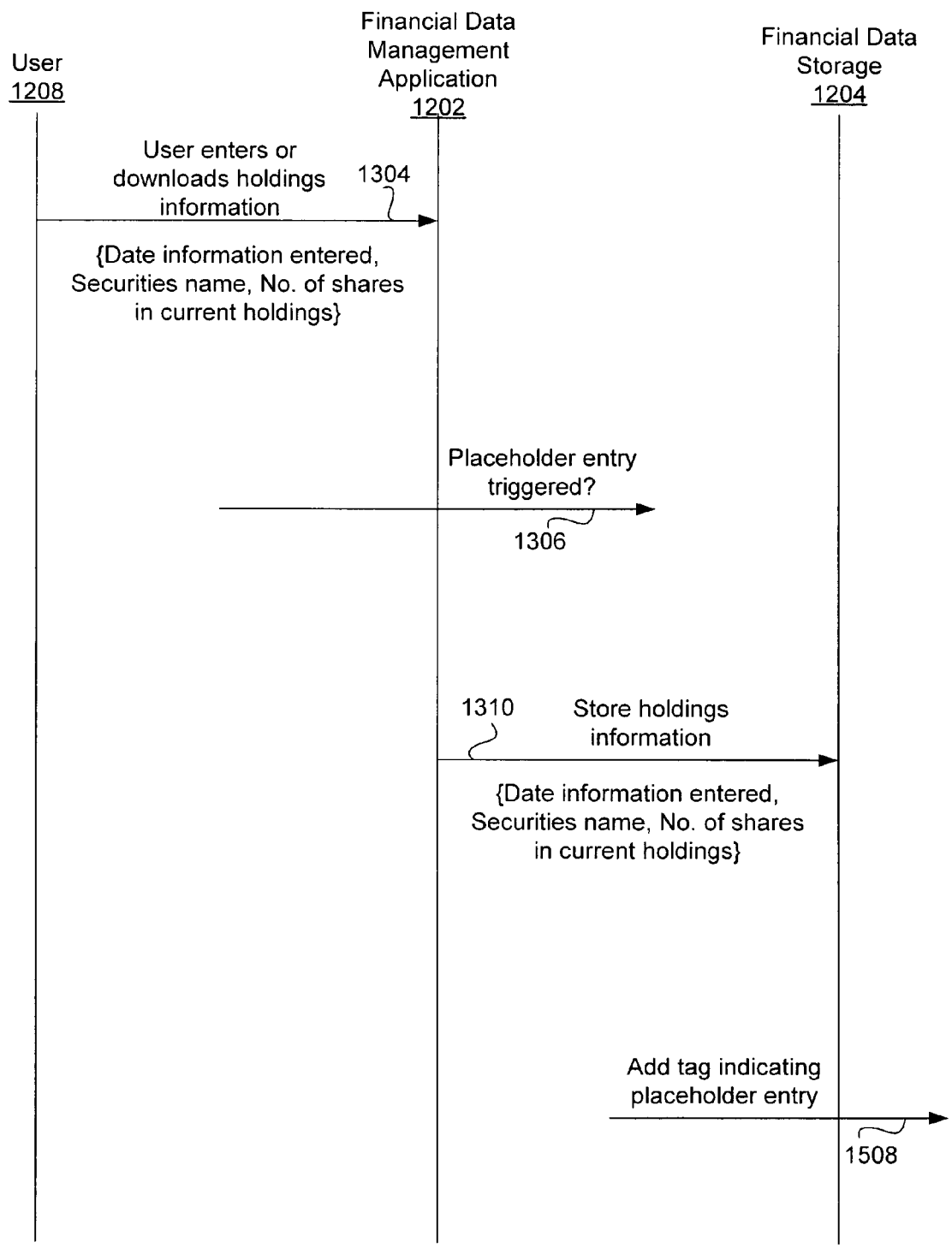
FIG. 15 is an interaction diagram illustrating a method of setting up a placeholder entry in a brokerage account of a financial data management application, according to one embodiment of the present invention.

FIG. 15 is an interaction diagram illustrating in more detail the method of setting up a placeholder entry in a financial data management application, according to one embodiment of the present invention. As explained with reference to FIG. 13, the user 1208 manually enters 1304 or downloads 1304 from a remote web site current holdings information to the financial data management application 1202. The current holdings information may be entered 1304 when the user sets up an account with the financial data management application 1202, although the user may enter the current holdings information during regular use of an account previously set up with the financial data management application 1202. In one embodiment, the holdings information relates to the user's current securities holdings, and includes the names of the securities and the total number of shares of the securities owned by the user.

The financial data management application 1202 determines 1306 whether, given the entered holdings information, a placeholder entry should be generated. A placeholder entry should be generated if the holdings information does not include the complete historical transaction information that led to the current holdings. For example, for a brokerage account, if the entered holdings information includes the securities names and the number of shares in the brokerage account but does not include the cost basis and the date of the transaction, a placeholder entry should be generated for the entered holdings so that the historical transaction information may be entered later on when the user has more time and or is willing to put in more efforts.

The financial data management application 1202 stores 1310 the entered holdings information to the financial data storage database 1204. For example, the date on which the holdings information is entered, the securities name, and the number of shares in the current holdings are stored. Also, if the financial data management application 1202 determined 1306 that a placeholder entry should be generated for the entered holdings information, a tag indicating a placeholder entry is added 1508 to the stored holdings information so that the holdings information is stored as a placeholder entry. The placeholder entry is a regular entry except that a tag (or flag) is associated with the placeholder entry as an indication of a placeholder entry. Other than the tag (or flag) indicating a placeholder entry, the stored holdings information is treated like a normal transaction to the financial data management application.

Figure 16:
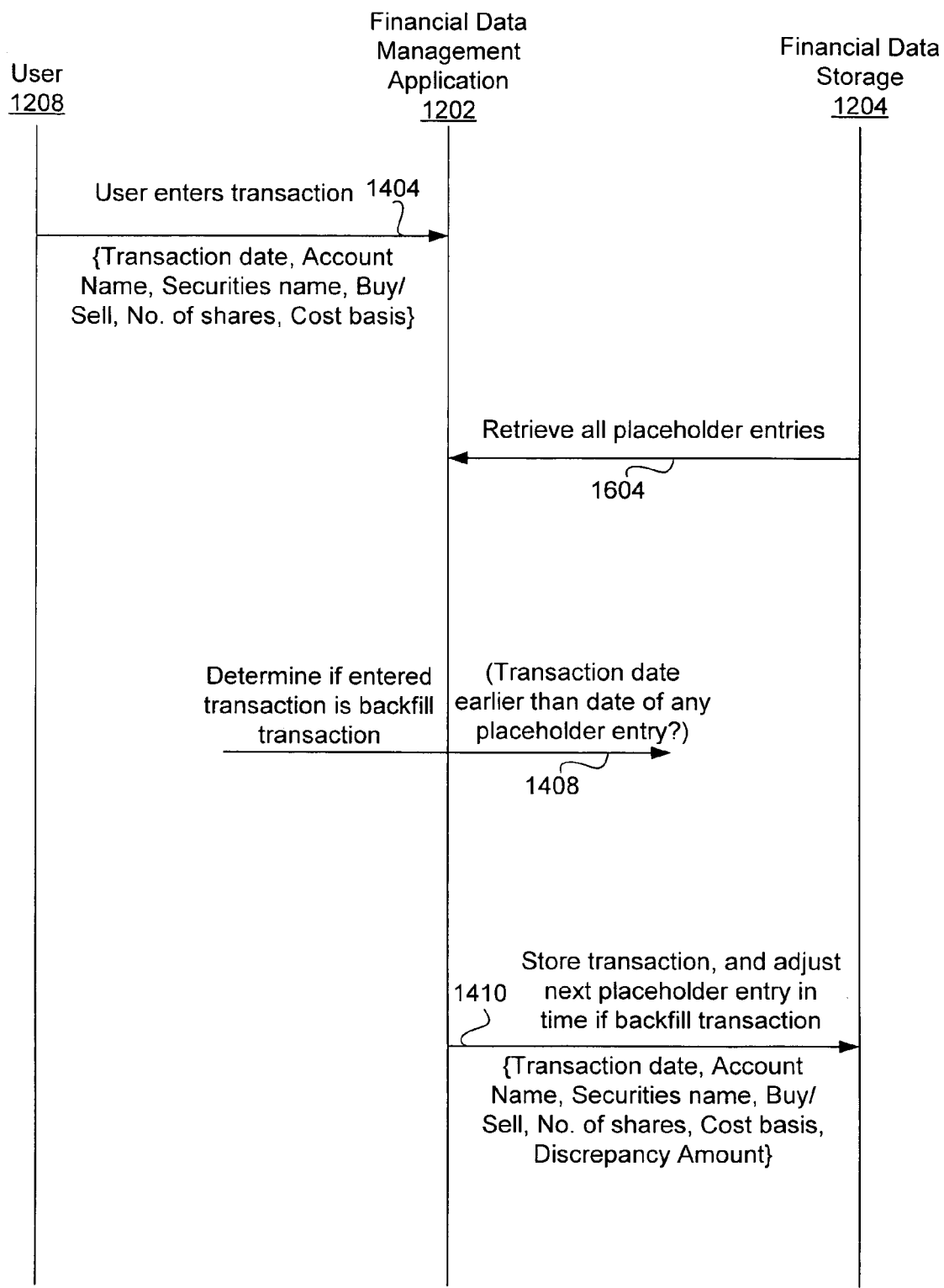
FIG. 16 is an interaction diagram illustrating a method of entering a backfill transaction corresponding to a placeholder entry in a brokerage account of a financial data management application, according to one embodiment of the present invention.

FIG. 16 is an interaction diagram illustrating the method of entering a backfill transaction corresponding to a placeholder entry in a brokerage account of a financial data management application, according to one embodiment of the present invention.

The user 1208 enters 1404 transaction information to the financial data management application 1202. In one embodiment, the transaction information includes the date of the transaction, the account to which the transaction pertains, the name of the securities, the type of transaction (buy/sell), the number of shares in the transaction, and the cost basis of the transaction, and the like. Although the embodiment of the present invention of FIG. 16 is illustrated herein in the context of a brokerage account for securities, the present invention can be used to set up placeholder entries for any other type of account, such as inventory, cash, mutual funds, bonds, savings, futures, etc., that has a current holding to be used as a placeholder entry and historical transactions that led to the current holdings. In such case, the transaction information will include information that is typically used by the particular type of account.

The financial data management application 1202 retrieves 1604 all the placeholder entries stored in the financial data storage database 1204. Then, the financial data management application 1202 determines 1606 whether the entered transaction is a backfill transaction corresponding to a placeholder entry, by determining whether there is any placeholder entry that has a date subsequent to the date of the received transaction. To this end, the financial data management application examines the dates of the placeholder entries that pertain to the securities same as that of the entered transaction and finds such placeholder entry with the earliest date but subsequent to the entered transaction. A placeholder entry having a date prior to the date of the entered transaction is not affected by the entered transaction.

If there is such placeholder entry, this means that the entered transaction is a backfill transaction entered to backfill the historical transactions that led to the current holdings in the placeholder entry. Thus, the financial data management application 1202 stores 1608 the entered transaction and also adjusts 1608 the placeholder entry to reflect the entered transaction and the process. For example, if the entered transaction is a "buy" transaction of securities, the number of shares in the placeholder entry for that stock is reduced by the number of shares in the entered "buy" transaction to reflect that the backfill "buy" transaction was entered for the placeholder entry. If the entered transaction is a "sell" transaction, then the number of shares in the placeholder entry for that stock is increased by the number of shares in the entered "sell" transaction to reflect that the backfill "sell" transaction was entered for the placeholder entry. The stored transaction information includes the transaction date, the account name, the securities name, the type of the transaction, the number of shares, the cost basis, and the discrepancy amount. The discrepancy amount is an indication as to how many shares are not accounted for in the placeholder entry. For example, if the original placeholder entry had 100 shares which was then adjusted by the 60 shares in the entered transaction, then the discrepancy is 40 shares, which now becomes the adjusted number of shares in the placeholder entry.

Figure 17:
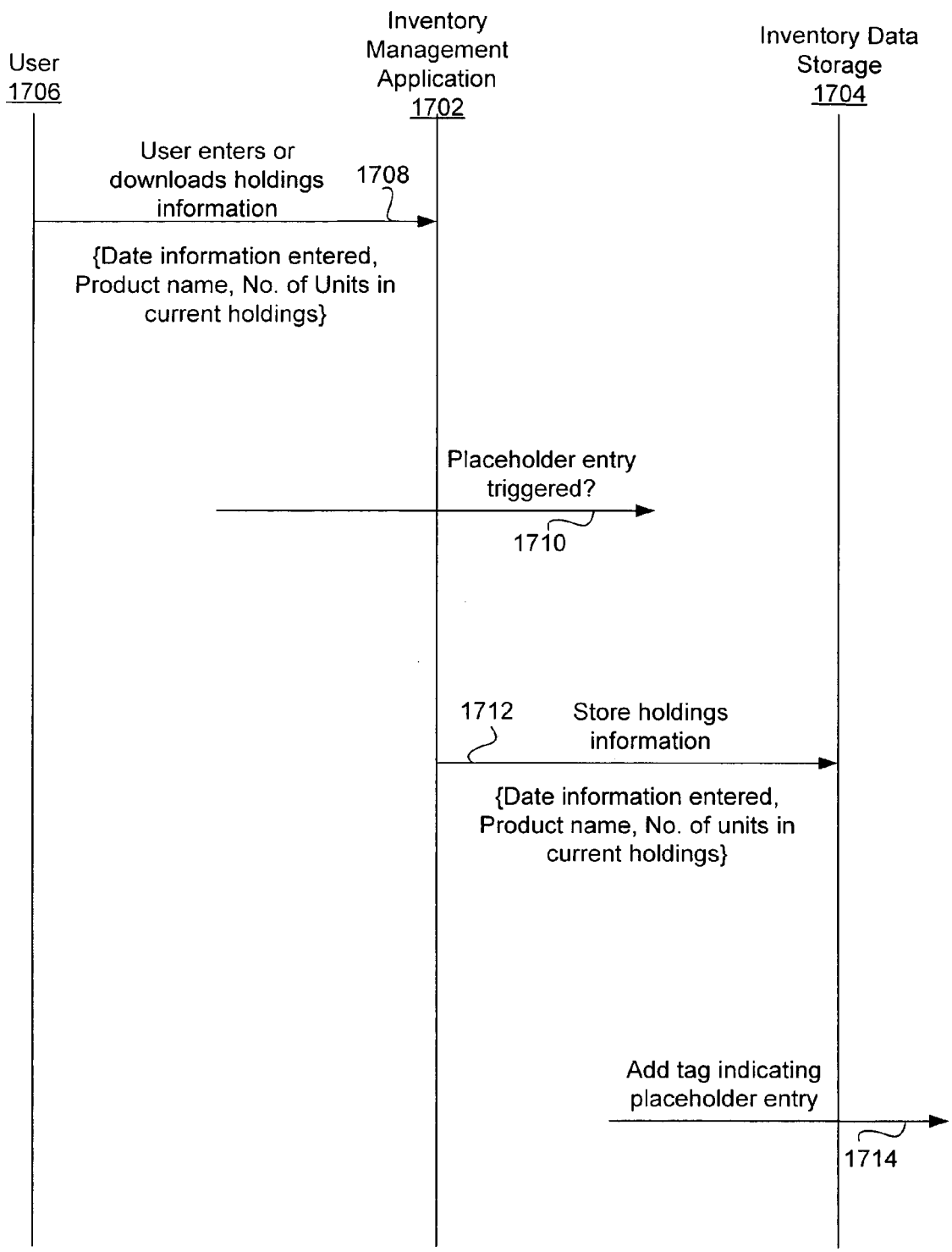
FIG. 17 is an interaction diagram illustrating a method of setting up a placeholder entry in an inventory management application, according to one embodiment of the present invention.

FIG. 17 is an interaction diagram illustrating a method of setting up a placeholder entry in an inventory management application, according to one embodiment of the present invention. As explained previously, the placeholder entries of the present invention may be used with other types of accounts, including an inventory account. The user 1706 enters 1708 current inventory (holdings) information to the inventory management application 1702. The current holdings information may be entered 1708 when the user sets up an account with the inventory management application 1702, although the user may also enter the current holdings information during regular use of an account previously set up with the inventory management application 1702. In one embodiment, the holdings information includes the name of the product and the total number of units of the product currently in the inventory.

The inventory management application 1702 determines 1710 whether a placeholder entry should be generated for entered holdings information. A placeholder entry should be generated if the entered inventory information does not include the complete historical transaction information that led to the current inventory. For example, if the entered holdings information includes the product name and the number of units in the inventory account but does not include the price per unit and the date of the transaction, a placeholder entry should be generated for the entered inventory information so that the historical transaction information may be entered later on when the user has more time and or is willing to put in more efforts.

The inventory management application 1712 stores the entered inventory information to the inventory data storage database 1704. For example, the date on which the inventory information is entered, the product name, and the number of units in the inventory are stored. Also, if the inventory management application 1702 determined that a placeholder entry should be generated for the entered inventory information, a tag indicating a placeholder entry is added 1714 to the stored inventory information so that the inventory information is stored as a placeholder entry.

Figure 18:
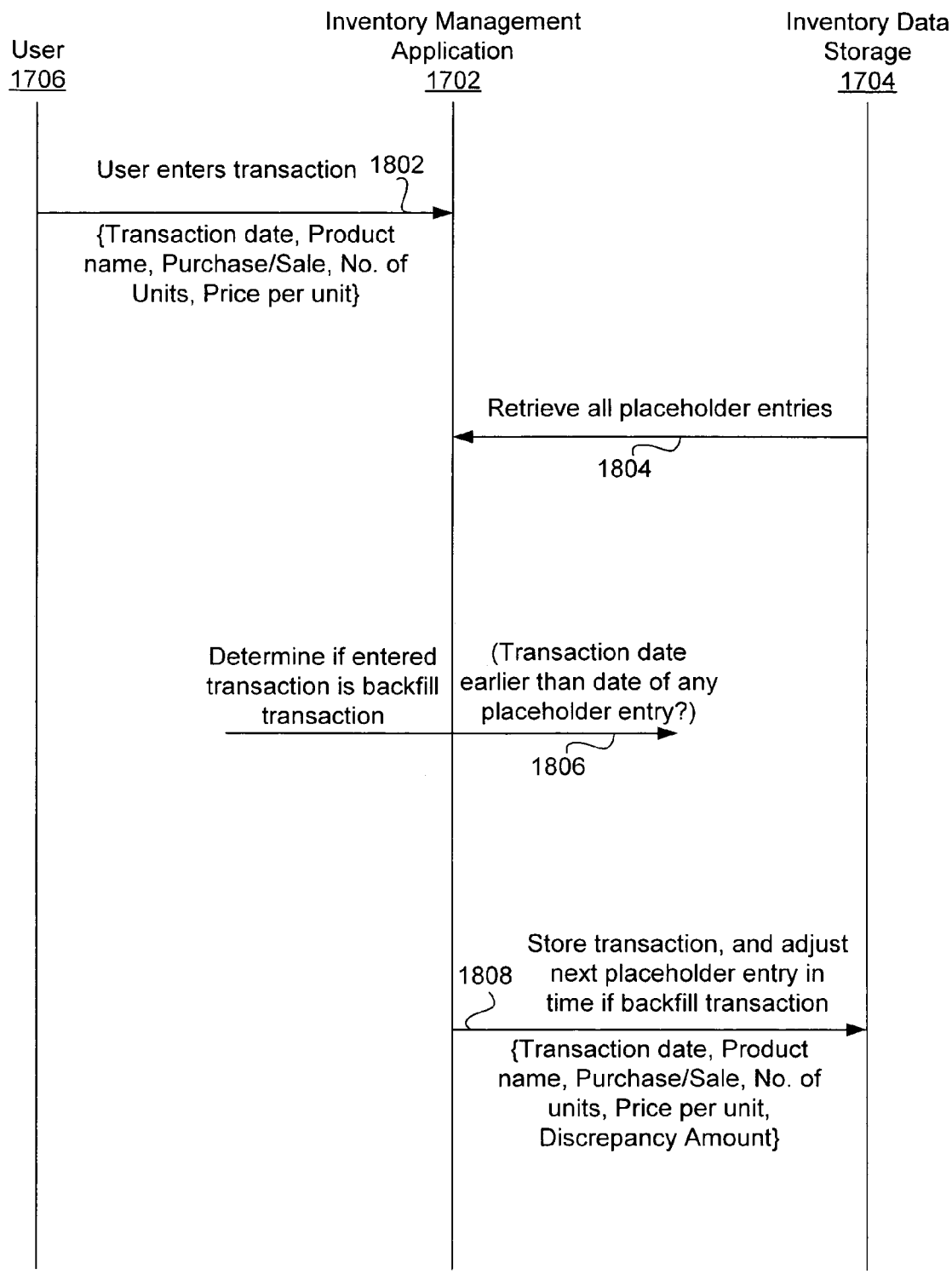
FIG. 18 is an interaction diagram illustrating a method of entering a backfill transaction corresponding to a placeholder entry in an inventory management application according to one embodiment of the present invention.

FIG. 18 is an interaction diagram illustrating the method of entering a backfill transaction corresponding to a placeholder entry in an inventory management application 1702, according to one embodiment of the present invention.

The user 1706 enters 1802 transaction information to the inventory management application 1702. In one embodiment, the transaction information includes the date of the transaction, the product name, the type of transaction (purchase/sale), the number of units bought or sold in the transaction, the price per unit, and the like. The inventory management application 1702 retrieves 1804 all the placeholder entries stored in the inventory data storage database 1704. Then, the inventory management application 1702 determines 1806 if the entered transaction is a backfill transaction corresponding to a placeholder entry by determining whether there is any placeholder entry that has a date subsequent to the date of the received transaction. To this end, the inventory management application examines the dates of the placeholder entries that pertain to the product name same as that of the entered transaction and finds such placeholder entry with the earliest date but subsequent to the entered transaction.

If there is such a placeholder entry, this means that the entered transaction is a backfill transaction entered to backfill the historical transactions that led to the current holdings in the placeholder entry. Thus, the inventory management application 1702 stores 1808 the entered transaction and also adjusts 1808 the placeholder entry to reflect the entered transaction and the process. For example, if the entered transaction is a "purchase" transaction of products, the number of units in the placeholder entry for that product is decreased by the number of units in the entered "purchase" transaction to reflect that the backfill "purchase" transaction was entered for the placeholder entry. If the entered transaction is a "sale" transaction, then the number of units in the placeholder entry for that product is increased by the number of units of the entered "sale" transaction to reflect that the backfill "sale" transaction was entered for the placeholder entry. The stored transaction information includes the transaction date, the product name, the type of transaction, the number of units, the cost per unit, and the discrepancy amount. The discrepancy amount is an indication as to how many units are not accounted for in the placeholder entry. For example, if the original placeholder entry had 100 units which was then adjusted by the 60 units of entered "purchase" transaction, then the discrepancy is 40 units, which now becomes the adjusted number of units in the placeholder entry.

The present invention has the advantage that users of the financial data management applications may quickly and easily start using such applications and obtain the benefit of using the applications without having to enter all the historical transactions information. The user may start using the financial data management applications even when the user has a limited amount of transaction information, as long as the current holdings information is complete. If any of the current holdings information lacks the complete transaction history, a placeholder entry is generated for the corresponding holdings information. The user can enter the historical transactions by entering backfill transactions to adjust the placeholder entries. The placeholder transactions are adjusted accordingly to reflect the entered backfill transaction and maintain the correct balance of holdings not accounted for in the placeholder transactions.

Placeholder entries with shares not accounted for by the backfill transactions may prevent the financial data management applications from calculating various investment performance and tax data. Any calculation that requires an accurate cost basis may not be possible if there is a placeholder entry that has shares not accounted for by a backfill transaction. For example, capital gain/loss, Return-on-Investment (ROI), and tax implications require the entering of a complete history of backfill transactions. Where these calculations have been made with placeholder entries not fully accounted for, the results of these calculations may be shown in the financial data management application with an indication in the user interface that the results may not be accurate because the calculations were based upon placeholder entries not fully accounted for. This will motivate the users to enter the missing backfill transactions corresponding to the placeholder entries, because the users can immediately see the benefits of entering the backfill transactions. Example of such indication of missing backfill transactions are the "Enter" links 212, 302 shown in FIGS. 2 and 3.

The placeholder entries also allow users to continue using the financial data management application without the additional data entry efforts to enter the backfill transactions, if they do not need access to calculations that require all the backfill transaction information. For example, if the user is interested primarily in tracking his net worth, he will not need to backfill the transactions. Users can make the decision to backfill the transaction information on an account-by-account or security-by-security basis. Also, users may initially decide not to enter the backfill transactions but later on decide to backfill transactions if their goals for investment tracking have changed. Users are provided with a link that provides direct access to a screen for entering the backfill transactions. Note that the users are aware of the trade-offs they are making when they decide whether or not the backfill transactions should be entered, and are always free to make different tradeoffs.

Although the present invention has been described above with respect to several embodiments, various modifications can be made within the scope of the present invention. The present invention can be embodied in the form of a computer program product stored on a computer readable medium. Accordingly, the disclosure of the present invention is intended to be illustrative, but not limiting, of the scope of the invention, which is set forth in the following claims.

What is claimed is:

1. A method for managing data in a financial data management application (FDMA) having a list of transactions comprising:
   obtaining a holdings record identifying a security and a net number of shares of the security;
   identifying, within the list, a first transaction comprising a first transaction date and a first transaction number of shares for the security;
   calculating, by execution on a hardware processor, a first difference between the net number of shares and the first transaction number of shares;
   creating, by execution on the hardware processor, a placeholder entry for the security, wherein the placeholder entry comprises a placeholder date and a placeholder number of shares, and wherein the placeholder number of shares is set to the first difference;
   adding the placeholder entry to the list of transactions;
   identifying, within the list and after adding the placeholder entry to the list, a second transaction comprising a second transaction date and a second transaction number of shares for the security;
   calculating, by execution on the hardware processor, a second difference between the placeholder number of shares and the second transaction number of shares after adding the placeholder entry to the list; and
   deleting the placeholder entry from the list in response to the second difference equaling zero.

2. The method of claim 1, further comprising:
   identifying a third transaction in the FDMA after identifying the first transaction, wherein the third transaction comprises a third transaction date and a third transaction number of shares for the security;
   calculating a third difference between the placeholder number of shares and the third transaction number of shares after creating the placeholder entry; and
   setting the placeholder number of shares to the third difference.

3. The method of claim 1, further comprising:
   identifying a third transaction in the FDMA after identifying the first transaction, wherein the third transaction comprises a third transaction date and a third transaction number of shares for the security;
   calculating a sum of the first transaction number of shares and the third transaction number of shares;
   calculating a third difference between the net number of shares and the sum; and
   setting the placeholder number of shares to the third difference after creating the placeholder entry.

4. The method of claim 1, wherein the holdings record is external to the FDMA.

5. The method of claim 1, wherein the holdings record is obtained from a user.

6. The method of claim 1, wherein the holdings record is obtained from a financial account website.

7. The method of claim 1, further comprising:
   creating a tag for the placeholder entry before identifying the first transaction; and
   searching for the placeholder entry after identifying the first transaction using the tag.

8. The method of claim 1, wherein the FDMA is a tax preparation application.

9. The method of claim 1, wherein the FDMA is an accounting application.

10. A financial data management system for managing financial data, comprising:
    a hardware processor;
    a financial account website configured to maintain a holdings record identifying a security and a net number of shares of the security;
    a financial data management application (FDMA) operatively connected to the financial account website and having a list of transactions, wherein the FDMA is configured to:
       create, by execution on the hardware processor, a placeholder entry for the security comprising a placeholder date and a placeholder number of shares, wherein the placeholder number of shares is set to a first difference between the net number of shares and a first transaction number of shares;
       add the placeholder entry to the list of transactions;
       calculate, by execution on the hardware processor, a second difference between the placeholder number of shares and a second transaction number of shares after adding the placeholder entry to the list; and
       delete the placeholder entry from the list of transactions in response to the second difference equaling zero; and
    a user interface operatively connected to the FDMA and configured to:
       identify, within the list, a first transaction comprising a first transaction date and the first transaction number of shares for the security; and
       identify, within the list and after adding the placeholder entry, a second transaction comprising a second transaction date and the second transaction number of shares for the security.

11. The system of claim 10, wherein the user interface is further configured to:
    identify a third transaction comprising a third transaction data and a third transaction number of shared for the security.

12. The system of claim 11, wherein the FDMA is further configured to:
calculate a third difference between the placeholder number of shares and the third transaction number of shares after creating the placeholder entry, and
set the placeholder number of shares to the third difference.

13. The system of claim 11, wherein the FDMA is further configured to:
calculate a sum of the first transaction number of shares and the third transaction number of shares,
calculate a third difference between the net number of shares and the sum, and
set the placeholder number of shares to the third different after creating the placeholder entry.

14. The system of claim 10, further comprising:
a database for storing the first transaction.

15. The system of claim 10, wherein the FDMA is a tax preparation application.

16. The system of claim 10, wherein the FDMA is an accounting application.

17. A computer program product stored on a computer readable medium storing computer executable instructions comprising functionality to:
obtain a holdings record identifying a security and a net number of shares of the security;
identify a first transaction within a list of transactions in a financial data management application (FDMA), comprising a first transaction date and a first transaction number of shares for the security;
calculate a first difference between the net number of shares and the first transaction number of shares;
create a placeholder entry for the security, wherein the placeholder entry comprises a placeholder date and a placeholder number of shares, and wherein the placeholder number of shares is set to the first difference;
add the placeholder entry to the list of transactions;
identify, within the list and after adding the placeholder entry to the list, a second transaction after identifying the first transaction, wherein the second transaction comprises a second transaction date and a second transaction number of shares for the security;
calculate a second difference between the placeholder number of shares and the second transaction number of shares after adding the placeholder entry to the list; and
delete the placeholder entry from the list in response to the second difference equaling zero.

18. The computer readable medium of claim 17, the computer executable instructions further comprising functionality to:
identify a third transaction in the FDMA after identifying the first transaction, wherein the third transaction comprises a third transaction date and a third transaction number of shares for the security;
calculate a third difference between the placeholder number of shares and the third transaction number of shares after creating the placeholder entry; and
set the placeholder number of shares to the third difference.

19. The computer readable medium of claim 17, the computer executable instructions further comprising functionality to:
identify a third transaction in the FDMA after identifying the first transaction, wherein the third transaction comprises a third transaction date and a third transaction number of shares;
calculate a sum of the first transaction number of shares and the third transaction number of shares;
calculate a third difference between the net number of shares and the sum; and
set the placeholder number of shares to the sec-end third difference after creating the placeholder entry.

20. The computer readable medium of claim 17, wherein the holdings record is external to the FDMA.

21. The computer readable medium of claim 17, wherein the holdings record is obtained from a user.

22. The computer readable medium of claim 17, wherein the holdings record is obtained from a financial account website.

23. The computer readable medium of claim 17, the computer executable instructions further comprising functionality to:
create a tag for the placeholder entry before identifying the first transaction; and
search for the placeholder entry after identifying the first transaction using the tag.

24. The computer readable medium of claim 17, wherein the FDMA is a tax preparation application.

25. The computer readable medium of claim 17, wherein the FDMA is an accounting program.

26. A method for managing data in a financial data management application (FDMA) having a list of transactions comprising:
obtaining a holdings record identifying a security and a net number of shares of the security;
creating, by execution on a hardware processor, a placeholder entry, for the security, comprising a placeholder date and a placeholder number of shares set to the net number of shares;
adding the placeholder entry to the list of transactions;
creating, within the list, a first transaction after creating the placeholder entry, wherein the first transaction comprises a first transaction date and a first transaction number of shares for the security, and wherein the placeholder entry is a substitute for a plurality of buy transactions associated with the security before creating the first transaction;
calculating, by execution on the hardware processor, a first difference between the net number of shares and the first transaction number of shares;
updating the placeholder entry within the list by setting the placeholder number of shares to the first difference;
creating, within the list and after updating the placeholder entry, a second transaction comprising a second transaction date and a second transaction number of shares for the security;
calculating, by execution on the hardware processor, a second difference between the placeholder number of shares and the second transaction number of shares after updating the placeholder entry; and
deleting the placeholder entry from the list in response to the second difference equaling zero.

* * * * *

UNITED STATES PATENT AND TRADEMARK OFFICE
CERTIFICATE OF CORRECTION

| | | |
|---|---|---|
| PATENT NO. | : 7,797,216 B2 | |
| APPLICATION NO. | : 10/756736 | |
| DATED | : September 14, 2010 | |
| INVENTOR(S) | : David R. Larsen et al. | |

It is certified that error appears in the above-identified patent and that said Letters Patent is hereby corrected as shown below:

In Claim 19, Column 16 (line 9), the word "sec-end" should be deleted.

Signed and Sealed this

Thirtieth Day of November, 2010

David J. Kappos
*Director of the United States Patent and Trademark Office*